No. 804,541. PATENTED NOV. 14, 1905.
H. LENTZ.
TURBINE ENGINE.
APPLICATION FILED APR. 4, 1905.

3 SHEETS—SHEET 1.

WITNESSES;
George G. Schoenlank
O. H. Berrigan

INVENTOR,
Hugo Lentz,
BY F. Van Oldemeel
HIS ATTORNEY

No. 804,541.

PATENTED NOV. 14, 1905.

H. LENTZ.
TURBINE ENGINE.
APPLICATION FILED APR. 4, 1905.

3 SHEETS—SHEET 3.

WITNESSES,
George G. Schoenlank
N. H. Berrigan

INVENTOR,
HUGO LENTZ,
BY H. Van Oldenneel
HIS ATTORNEY.

UNITED STATES PATENT OFFICE.

HUGO LENTZ, OF BERLIN, GERMANY.

TURBINE-ENGINE.

No. 804,541.      Specification of Letters Patent.      Patented Nov. 14, 1905.

Application filed April 4, 1905. Serial No. 253,753.

*To all whom it may concern:*

Be it known that I, HUGO LENTZ, a subject of the German Emperor, residing at 10/11 Potsdamerstrasse, Berlin, Germany, have invented a new and useful Improvement in Turbine-Engines; and I do hereby declare the following to be a full, clear, and exact description of the same.

This invention relates to turbine-engines, including steam-turbines and gas-turbines.

The improvements consist in providing new combinations and arrangements whereby economy is secured in manufacture as well as in operation of the turbine-engine.

Generally speaking, I provide, first, a new form of nozzle giving increased effectiveness; second, a new form of guiding and redirecting device for multistage turbine-engines; third, a new arrangement of parts whereby a turbine-engine employing but one wheel may become a multistage engine; fourth, a new arrangement in guideways or directing channels for turbine-engines whereby losses due to eddy-currents and friction in the guideways or channels are minimized or eliminated; fifth, a new arrangement of confining devices whereby the casing of the turbine-engine is protected from the direct heating action of the jets of pressure medium, and, sixth, new combinations of said parts, whereby the several advantages hereinafter mentioned may be realized in the same machine.

Figure 1:
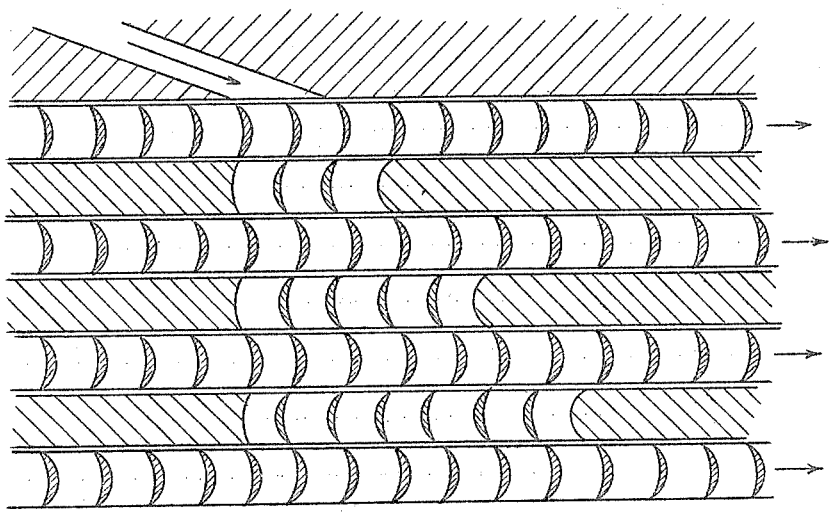
Figure 2:
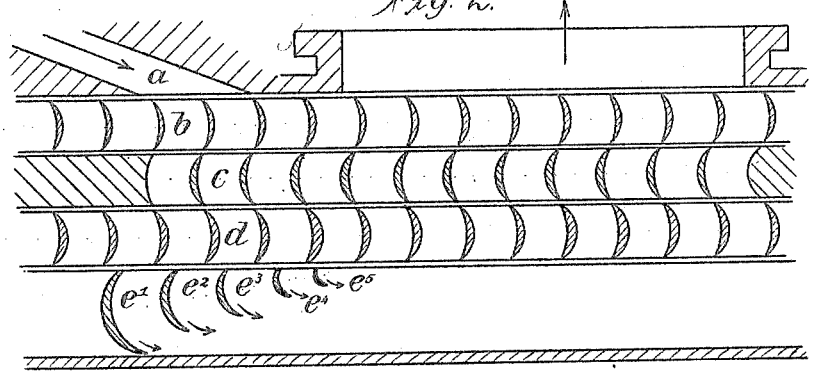
Figure 3:
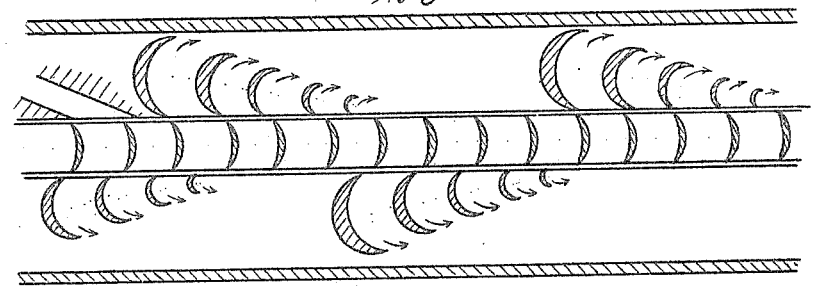
Figure 4:
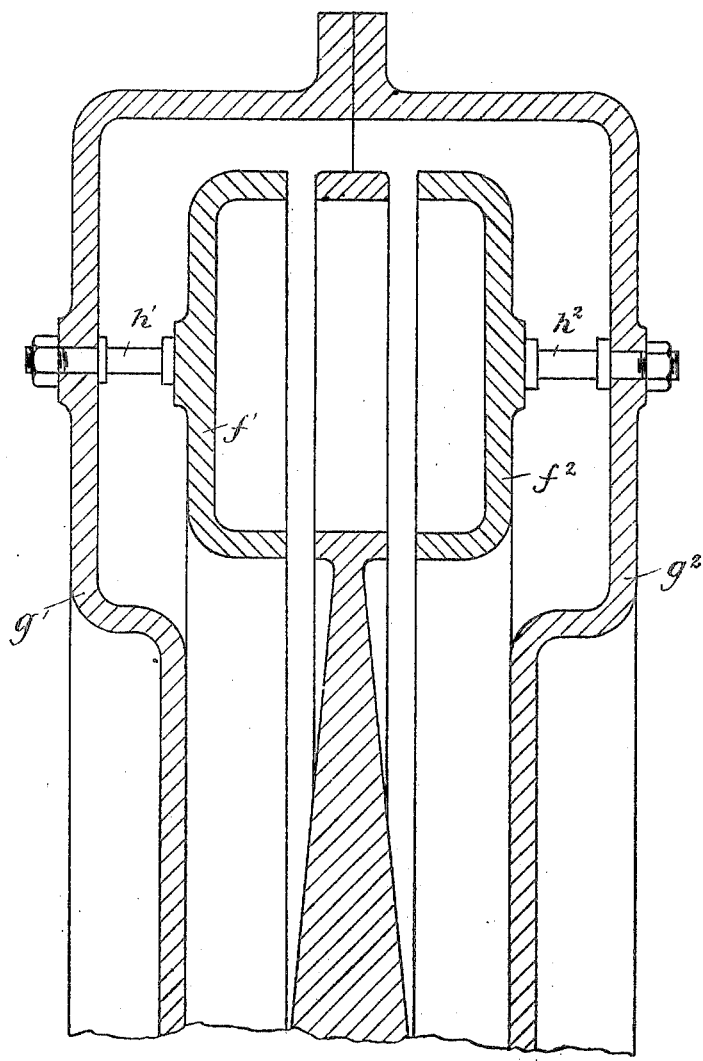
Figure 5:
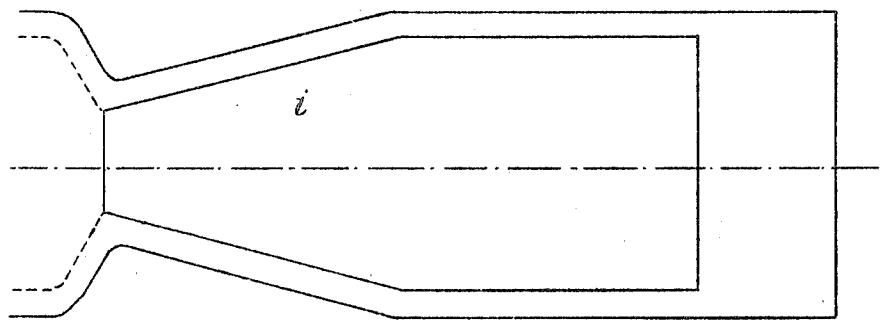
Figure 6:
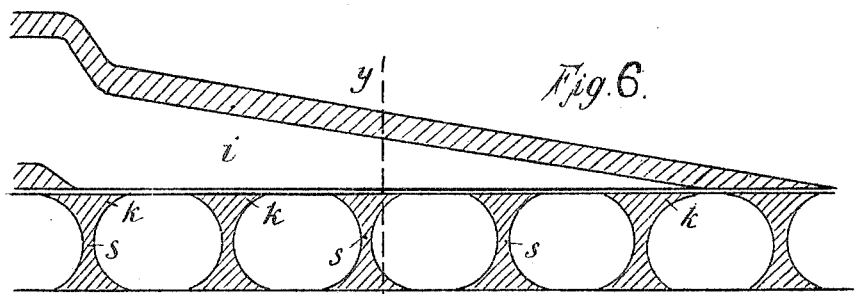
Figure 7:
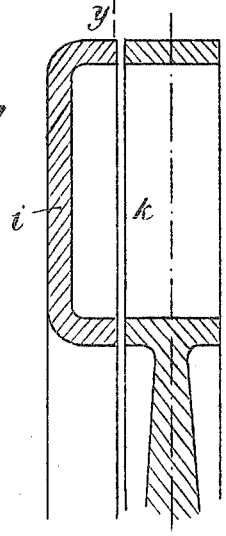

Referring to the accompanying drawings, Figure 1 shows in section an ordinary form of multistage turbine-engine prior to my invention. Fig. 2 is a sectional view of a turbine-engine having a succession of wheels and provided with one form of my new guiding and re-presenting means. Fig. 3 is a sectional view of a turbine-engine having a single wheel and a plurality of re-presenting means alternately at opposite sides of the wheel and converting the latter into a multistage machine. Fig. 4 shows in cross-section a part of a turbine-engine devised by me and provided with means to protect the machine-case from direct action of the heat. Figs. 5, 6, and 7 show a new combination of parts whereby the supply-nozzle is in part composed of the paddles of a turbine-wheel.

Referring to Fig. 1, it will be seen that one ordinary form of multistage turbine-engine contains alternately-arranged power-wheels A, B, C, and D and guiding means E, F, and G for guiding the stream of pressure medium into impact with the paddles of the successive wheels. It is obvious that with the form of machine illustrated in Fig. 1 there will be as many turbine-wheels as there are desired stages of pressure utilization. In the form of machine shown in Fig. 2 this increase in number of wheels is rendered unnecessary in view of the addition of a re-presenting device which guides the pressure medium after it has left the paddles of a wheel back to such wheel and again acts thereon. The re-presenting device here spoken of preferably consists of a succession (any desired number) of fixed curved blades, such as $e'$, $e^2$, $e^3$, $e^4$, and $e^5$, Fig. 2, the blades being curved to deflect the pressure medium in the same direction as the travel of the wheel. For the best results I prefer that the blades shall decrease in curvature, as shown, in the direction of travel of the wheel and shall also decrease in width in the same direction, the practical result being a succession of re-presenting devices which do not interfere with the jet of pressure medium returning to the wheel. The guide-blade extremities of a group are located in a line which defines an obtuse angle with relation to the edge of the running paddles. The pressure medium flows to the running wheel as free jets of different lengths corresponding to the individual guide-plates of a group.

It is obvious that the employment of the re-presenting means shown will result in guiding the pressure medium again in contact with the several wheels. The same result, repeatedly subjecting the paddles to the pressure medium, may be secured with single-wheel turbine-engines, as illustrated in Fig. 3, wherein groups of guiding-blades constituting a number of re-presenting devices are alternately fixed at opposite sides of the turbine-wheel. A study of this drawing will show that the stream of pressure medium will issue from the nozzle $a$ upon the running wheel and pursues a serpentine path, owing to deflections by the groups of plates, and repeatedly strikes against the impact-faces of the paddles of the wheel, thus effecting the multistage advantages of the plural-wheel machines.

The re-presenting devices composed of successive blades, as shown, may be located in one or more annular enlargements of the casing at one or both sides of the blade-rim, though such re-presenting devices may be lodged in canallike hollows in the casing or in added trough-like rings.

It is obvious that the relative arrangement of re-presenting devices shown in Fig. 3 may be repeated for effecting an opposite rotation of the wheel, permitting either forward or backward rotation of the single wheel. It is not, however, absolutely necessary that the opposite guiding systems in the case of a reversible turbine be alike or symmetrical in both directions.

If the individual blades of a group be placed close together, a thicker jet is thrown on the broader blades than on the narrower blades.

As heretofore stated, the re-presenting devices may be contained in rings or other bodies separate from the machine-casing, as shown in Fig. 4, wherein the two rings $f'$ and $f^2$ constitute a chamber, which is connected with the exhaust and retards to a considerable degree the access of heat to the machine-casing, which may consist of opposite shells $g'$ and $g^2$. To further retard the heating of the casing, the joints or sockets and the spacing or supporting pieces $h'$ and $h^2$ may be made of a material which is a poor conductor of heat. Free hollow chambers surround the rings $f'$ and $f^2$.

It has been observed that at the efflux of elastic fluids from a simple though well-rounded mouth into the open atmosphere a velocity of flow corresponding to the velocity of sound is never exceeded. In order, however, to utilize the steam energy as fully as possible and to obtain good mechanical effect in a turbine, De Laval has constructed a nozzle with a conical enlargement wherein the steam expands until the steam compression is attained and its particles hastened in the measure of the transformed energy of heat. The various forms of such conical nozzles comprise, so far as I am aware, chambers closed on all sides and which continuously surround the expanding jet of liquid which is being delivered. Theoretical considerations of turbines teach that as tangential an impact as possible is to be aimed at, although the conditions of construction usually make the selection of a proportionately larger angle of impact unnecessary. The nearer the theoretic conditions are approached the thinner will be the nozzle-walls until the attainable limit is reached. The production of such thin walls results in a nozzle-wall tapering to and terminating in a wedge-shape point, which is not only difficult to produce, but readily breaks and causes difficulties, especially at the sharp outer edges. I have devised a new and simple form of nozzle which does not have the defects mentioned and by which I realize more closely than heretofore the theoretically desirable conditions. The new nozzle is so arranged with respect to the turbine-wheel that the paddles of such wheel partially constitute the walls of the nozzle. Obviously such new feature of construction may also be embodied in the steam races or channels which re-present the steam to the same wheel or which project it against the paddles of another wheel. Figs. 5, 6, and 7 of the accompanying drawings show, somewhat diagrammatically, one form of such invention. $i$ indicates the nozzle, which may be of any form desired. One wall or side of the nozzle is much shorter than the opposite wall, and the paddles of the running wheel constitute, in effect, a continuation of such shorter wall or side, and the steam is as a consequence more directly and positively driven against the paddles than in the case of nozzles all of whose sides or walls were of corresponding length.

The form of nozzle here under consideration is easy to produce, is durable, and is without defects in operation owing to breakage or other cause. It also permits the employment of acute impact-angles not heretofore to be considered owing to the difficulties encountered in producing prior forms of nozzles. The selection of the acute angles also permits when the new form of nozzle is used the employment of a form of paddles upon the turbine-wheel having broad faces, as shown in Fig. 6, without losses in impulse and consequent decrease in efficiency.

The improved form of nozzle herein described, and illustrated in Figs. 5, 6, and 7, constitutes the subject-matter of a separate application, Serial No. 283,091, filed October 17, 1905, as a division of this case.

I desire to be understood as not limiting my invention to the exact embodiments herein shown and described. Other forms will suggest themselves to persons skilled in the art, and these will be within the scope of my claims.

What I claim is—

1. In a turbine-engine, a turbine-wheel provided with paddles, a nozzle for directing pressure medium to said paddles, and a plurality of fixed curved plates, which are progressively smaller in the direction of the run of the wheel, for receiving the pressure medium after it has left the wheel and returning it to the blades thereof.

2. In a turbine-engine, a turbine-wheel provided with paddles, a nozzle for directing pressure medium to said paddles, and fixed curved plates arranged in groups at opposite sides of said wheel for repeatedly returning the pressure medium to the paddles of the wheel.

3. In a turbine-engine, a turbine-wheel provided with paddles, concentrically-arranged raceways at opposite sides of the paddles and separated from the machine-casing by an annular space.

4. In a turbine-engine, a turbine-wheel provided with paddles, concentrically-arranged trough-shaped rings constituting raceways at opposite sides of the paddles and spacing means between the said rings and the machine-casing.

5. In a turbine-engine, a turbine-wheel provided with paddles, a continuous concentrically-arranged raceway opposite said paddles, and deflecting means arranged in said raceway at intervals.

In testimony whereof I have signed my name to this specification in the presence of two subscribing witnesses.

HUGO LENTZ.

Witnesses:
 HENRY HASPER,
 WOLDEMAR HAUPT.